(12) United States Patent  
Dietz et al.

(10) Patent No.: US 8,678,060 B2
(45) Date of Patent: Mar. 25, 2014

(54) JOINING SURFACE TREATMENT DEVICE AND METHOD

(75) Inventors: Siegfried Dietz, Ulrichstein (DE); Florian Gamringer, Wernberg-Koeblitz (DE)

(73) Assignee: FFT EDAG Produktionssysteme GmbH & Co. KG, Fulda (DE)

( * ) Notice: Subject to any disclaimer, the term of this patent is extended or adjusted under 35 U.S.C. 154(b) by 59 days.

(21) Appl. No.: 13/411,593

(22) Filed: Mar. 4, 2012

(65) Prior Publication Data
US 2013/0092324 A1 Apr. 18, 2013

(30) Foreign Application Priority Data
Mar. 4, 2011 (EP) .................... 11157081

(51) Int. Cl.
*B29C 65/02* (2006.01)
*B29C 65/10* (2006.01)
*B32B 37/06* (2006.01)

(52) U.S. Cl.
USPC ............ 156/499; 156/538; 156/578; 118/641

(58) Field of Classification Search
USPC ............ 156/272.2, 273.3, 273.5, 281, 307.3, 156/307.5, 307.7, 322, 499, 538, 540, 578; 118/620, 641–643
See application file for complete search history.

(56) References Cited

U.S. PATENT DOCUMENTS

| 4,660,501 | A | * | 4/1987 | Nagata et al. | 118/203 |
| 4,896,274 | A | * | 1/1990 | Hohn et al. | 700/247 |
| 6,313,448 | B1 | | 11/2001 | Johnson | |
| 6,471,774 | B1 | * | 10/2002 | Krueger | 118/264 |
| 6,475,316 | B1 | | 11/2002 | Kirk et al. | |
| 6,638,383 | B2 | | 10/2003 | Tarnawskyj et al. | |
| 7,041,193 | B2 | | 5/2006 | Bogert et al. | |
| 7,043,815 | B2 | * | 5/2006 | Lande et al. | 29/430 |
| 7,467,452 | B2 | | 12/2008 | Lande et al. | |
| 7,838,082 | B2 | | 11/2010 | Nesbitt | |
| 2003/0099782 | A1 | * | 5/2003 | Blum et al. | 427/554 |
| 2008/0227915 | A1 | * | 9/2008 | Konishi et al. | 525/123 |
| 2010/0154669 | A1 | * | 6/2010 | Borremans | 101/488 |

OTHER PUBLICATIONS

Development of an Adhesive-Primer for Polypropylene Composites, Sep. 15, 2009, Trudel-Boucher, Ton-That, Denault, Abstract.
How to Paint your Car, 2003, Parks, Jacobs, p. 22.

* cited by examiner

*Primary Examiner* — Sing P Chan
(74) *Attorney, Agent, or Firm* — Von Rohrscheidt Patents

(57) ABSTRACT

A joining surface treatment device and a joining surface treatment method for treating a joining surface of a component which joining surface is used for joining two components, the joining surface treatment device comprising at least one heat source for heating a portion of a surface of a first component at which portion the first component shall be joined with a second component; and a primer application device for applying a primer to a portion of the surface of the first component which portion is heatable by the at least one heat source, wherein the at least one heat source is arranged so that it can heat the first component before and/or after applying the primer.

18 Claims, 6 Drawing Sheets

JOINING SURFACE TREATMENT DEVICE AND METHOD

RELATED APPLICATIONS

This application claims priority from European patent application EP 11 157 081 filed on Mar. 4, 2011 which is incorporated in its entirety by this reference.

FIELD OF THE INVENTION

The invention relates to a joining surface treatment device and a joining surface treatment method for treating a joining surface for joining two components. The invention relates in particular to a joining surface treatment device and a joining surface treatment method, wherein a primer or adhesion enhancement agent is applied to a surface of a component in a particular manner before the component is further processed, for example, by a gluing device for gluing it together with another component.

BACKGROUND OF THE INVENTION

During industrial fabrication of products made from plural components, components made from different and/or identical materials have to be bonded together by material engagement. For example, the joining technique is used in the motor vehicle industry when mounting front windows and rear windows etc. of vehicles. Herein, high quality glue joints between glass and metal have to be fabricated which comply with pertinent safety requests and/or warranty requirements of manufacturers for such joints.

It is known in the art that, initially, the components have to be cleaned from adhering contamination or protective oil films when producing a glue joint with two components. It is furthermore known to treat a surface of a component with a primer, which is a surface adhesion enhancement agent, in order to improve or enable the adhesion of components.

U.S. Pat. No. 7,467,452 B2 discloses a method for applying flowable materials, in particular glue, on components of products to be produced where the surface of the components before applying the flowable materials is cleaned, for example, through plasma or a flashlight. Herein, the flashlight can also be used for heating the surface of the component. Furthermore, also applying a primer after cleaning the surface and before applying flowable materials is known in the art.

The publication "Development of an adhesive-primer for polypropylene composites" by David-Trudel-Boucher, Tan Minh Ton-That and Johanne Denault, Industrial Materials Institute, National Research Council of Canada describes an adhesion capable primer or adhesion enhancement agent which enables or improves gluing polymers and in particular polypropylenes together.

In glue joints of components, however, in many cases only portions of the surfaces of the components have to be connected. This is the case in particular for glass windows of vehicles where only a narrow outer edge of the glass window is glued together with the body of the vehicle.

Furthermore, ever faster manufacturing processes demand shorter cycle times for producing safe glue joints. The critical time in these processes is the drying time or also airing time of the primer. The airing time is the time required by the primer to prepare the surface for gluing and to completely evaporate or ventilate air from the surface after being applied to the surface. Gluing can only be performed after completely airing the primer from the surface.

At present, solvent primers are being used in joining surface treatment devices and joining surface treatment methods for glass windows of vehicles like, for example, black primer which is a primer with soot particles mixed therein. A black primer of this type at an ambient temperature of approximately 20° C. has an airing time of approximately 30 seconds. In view of the required acceleration of production processes, however, this airing time is not short enough. Furthermore, it is also disadvantageous that when mixing the soot particles into the primer typically the soot particles are also distributed in the surrounding area. Subsequently, the soot particles included in the black primer are distributed into the surrounding area while airing the primer. Furthermore, it is detrimental for the environment that the black primer includes solvents which are released into the environment while airing the black primer. All these effects are undesirable. The requirements for cleaning the surface treatment device and/or the superordinated equipment as well as the components and also the effort for maintaining the required quality standards for the vehicle are increased.

BRIEF SUMMARY OF THE INVENTION

Thus it is an object of the invention to provide a joining surface treatment device and a joining surface treatment method for treating a joining surface for joining two components which are improved over currently available joining surface treatment devices and joining surface treatment methods.

The object is achieved through a joining surface treatment device for treating a joining surface of a component which joining surface is used for joining two components including at least one heat source for heating a portion of a surface of a first component at which portion the first component shall be joined with a second component, and a primer application device for applying a primer to the portion of the surface of the first component which portion is heatable by the at least one heat source, wherein the at least one heat source is arranged to heat the first component before and/or after applying the primer. The joining surface treatment device includes a heat source for heating a portion of a surface of a first component at which portion the first component shall be joined with a second component and a primer application device for applying a primer to a portion of the surface of the first component which portion is heatable by the heat source, wherein the heat source is arranged so that it can heat the first component before and/or after applying the primer.

Advantageous embodiments of the joining surface treatment device are provided in the following features, taken alone and/or in combination with each other:

the joining surface treatment device is configured so that the portion of the surface of the first component which portion was previously heated by the at least one heat source and to which the primer application device has applied the primer is heated again by the at least one heat source;

the joining surface treatment device includes a first heat source and a second heat source, wherein the second heat source is arranged for heating the portion of the surface of the first component which portion was heated by the first heat source and to which the primer application device has applied the primer, and the first heat source, the primer application device and the second heat source are arranged in this sequence one after another;

the at least one heat source and the primer application device are arranged relative to one another so that the at least one heat source heats the portion of the surface of the first component at which portion the first component shall be joined with the second component, and the heating is performed before and also after applying the primer by the primer application device;

a drive device for driving the arrangement including the at least one heat source and the primer application device in a movement relative to the first component;

the joining surface treatment device is configured so that the first component is moveable along the arrangement including the at least one heat source and the primer application device;

the at least one heat source includes an infrared radiation source or a laser source or an induction source or a hot air blower or a blower for introducing warm compressed air;

the first and second heat source respectively have a shape that is adapted to the joining surface and/or they are pivotable about the joining surface;

the primer application device is configured for applying hydro primer;

the primer application device is configured for applying heated primer;

the primer application device is configured so that it adjusts an amount of applied primer as a function of a velocity of a relative movement between the first component and the arrangement including the at least one heat source and the primer application device;

a receiver for receiving a first component so that a portion of a surface of the first component at which portion the first component shall be joined with a second component is oriented towards an arrangement including at least one heat source and a primer application device when the first component is treated with the joining surface treatment device;

a drive device for driving the receiver and/or the arrangement including the at least one heat source and the primer application device, so that the receiver and/or the arrangement move relative to one another; and a gluing device for gluing the first component and the second component together at the joining surface, the gluing device is arranged directly downstream of the joining surface treatment device.

Advantageously, the joining surface treatment device is configured so that the portion of the surface of the first component which portion was previously heated by the heat source and to which the primer application device applied the primer is heated again by the heat source.

Therefore, it is possible that the joining surface treatment device includes a first heat source and a second heat source, wherein the second heat source is arranged for heating the portion of the surface of the first component which portion was previously heated by the first heat source and to which the primer application device applied the primer, and wherein the first heat source, the primer application device and the second heat source are arranged in this sequence one after another.

Alternatively thereto, the heat source and the primer application device can be arranged relative to one another, so that the heat source heats the portion of the surface of the first component at which portion the first component shall be joined with the second component, wherein the heating is performed before and also after applying the primer by the primer application device.

Advantageously, the joining surface treatment device further includes a drive device for driving the arrangement including the heat source(s) and the primer application device in a movement relative to the first component.

The joining surface treatment device can be configured so that the first component is moveable along the arrangement including the heat source(s) and the primer application device.

The heat source(s) can be optionally configured as an infrared radiation source or a laser source or an inductive source or a hot air blower or a blower for introducing warm compressed air.

It is advantageous that the first and second heat sources each have a shape that is adapted to the joining surface and/or they are pivotable about the joining surface.

The primer application device is advantageously configured for applying hydro primer.

The primer application device can also be configured for applying heated primer.

The primer application device can be configured so that it adjusts the amount of applied primer as a function of the velocity of a relative movement between the first component and the arrangement including the heat source(s) and the primer application device.

It is possible that the above-mentioned joining surface treatment device forms an element of a piece of factory automation machinery for producing an object with at least two components. The factory automation machinery also includes a receiver for receiving a first component so that the portion of the surface of the first component at which portion the first component shall be joined with the second component is oriented towards the arrangement including the heat source(s) and the primer application device in the course of a treatment of the first component with the joining surface treatment device.

The factory automation machinery can include a drive device for driving the receiver and/or the arrangement including the heat source(s) and the primer application device, so that the receiver and/or the arrangement move relative to one another.

In one embodiment, the factory automation machinery can include a gluing device for gluing the first component and the second components together at the joining surface, wherein the gluing device is arranged directly downstream of the joining surface treatment device.

The object is furthermore achieved by a joining surface treatment method for treating a joining surface of a component for joining two components according to heating a portion of a surface of a first component by at least one heat source at which portion the first component shall be joined with a second component; and applying a primer by a primer application device to the portion of the surface of the first component which portion is heatable by the at least one heat source, wherein the heating step heats the first component before and/or after applying the primer. The joining surface treatment method includes the following steps: a first heating step of heating, by a heat source, a portion of a surface of a first component at which portion the first component shall be joined with a second component, a primer application step of applying a primer by a primer application device to a portion of the surface of the first component which portion was heated by the heat source and a second heating step of heating, by a heat source, the portion of the surface of the first component, which portion was previously heated in the first heating step and to which the primer was applied in the primer application step.

With the joining surface treatment device and the joining surface treatment method described above, in a first step, a partial heating of the surface of the first component is performed before applying the primer. Subsequently, in turn after applying the primer to the already previously heated portion of the surface, only a partial heating of the surface of the first component is performed. Herein, in particular warm air or compressed air can be used and preferably infrared radiators can be used. Especially the subsequent heating results in quick airing of the primer. Additionally, by partially heating the surface of the first component only in the portion in which primer has to be applied to the first component, unnecessary heating of the first component is prevented also in other surface portions which are not provided with the primer. Thus, the energy requirement of the joining surface treatment device and of the joining surface treatment method is minimized and no energy is wasted.

Furthermore, by an optimal adjustment of the primer temperature in the course of and after application to the first component, an optimal or shortest possible airing time of the primer can be provided. Thus, the cycle time for treating a component with the joining surface treatment device and the joining surface treatment method can be optimized and in particular shortened in comparison to the prior art.

Due to the above-described particular arrangement of the first and second heat source and the primer application device, the above-described steps, this device the first heating, the applying of the primer and the second heating, are combined in one treatment process. Thus, the treatment process can be completed by travelling along the joining surface of the component with the joining surface treatment device once. Advantageously, a gluing device can be arranged downstream directly adjacent thereto, which glues the treated component together with another component and thus completes the process of joining two components.

The above-described joining surface treatment device and the joining surface treatment method are useable in a particularly advantageous manner in the automotive industry or when mounting front and rear windows etc. of vehicles. The glue joints thus produced between glass and metal, for example, comply in all aspects with the pertinent safety requests and/or warranty requirements of producers of such joints.

BRIEF DESCRIPTION OF THE DRAWINGS

The invention is subsequently described based on advantageous embodiments with reference to the appended drawing Figures, wherein.

DETAILED DESCRIPTION OF THE INVENTION

Figure 1:
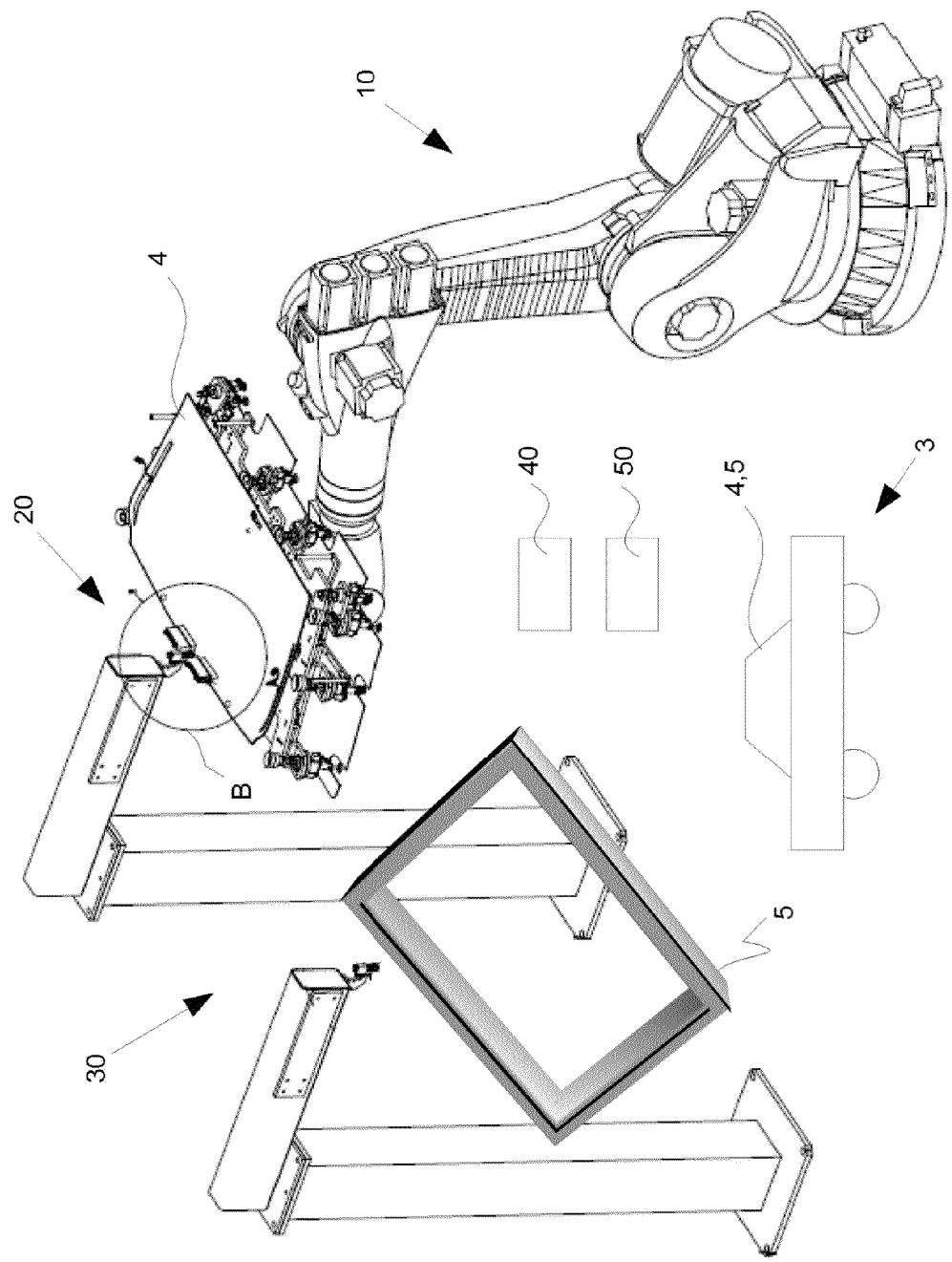
FIG. 1 illustrates a three dimensional view of factory automation machinery with a joining surface treatment device according to a first embodiment of the present invention.

FIG. 1 illustrates factory automation machinery 1 for producing an object 3 which is only schematically illustrated, like, for example, a vehicle and in particular a power-driven vehicle, from at least a first component 4 and a second component 5. The first component 4 which is illustrated in FIG. 1 as a glass pane like, for example, a front or rear window is manipulated by a robot 10 so that it is arranged under a joining surface treatment device 20. The joining surface treatment device 20 is subsequently described in more detail with reference to the detail B illustrated in a circle. The second component 5 is schematically illustrated in FIG. 1 as a body component of the object 3. A gluing device 30 is arranged downstream of the joining surface treatment device 20, by which the first and second components 4, 5 can be glued together by the gluing device. A control device 40 that is only schematically illustrated controls the robot 10, the joining surface treatment device 20 and/or the gluing device. The control or the regulation is provided as a function of detection results of a detection device 50 for detecting movements, positions, velocities, dosage amounts, filling amounts, temperatures, etc. which are detectable during operation of the factory automation machinery 1, wherein the detection device 50 is only schematically illustrated.

In the factory automation machinery 1 the first component 4 and also the second component 5 can be treated with the joining surface treatment device 20. However, also only the treatment of the first component 4 and the second component 5 with the joining surface treatment device 20 are feasible. The second component 5 can certainly also be the entire body of the vehicle, thus of the object 3. Subsequently, only a treatment of the first component 4 with the joining treatment device 20 is described, however, also a treatment of the second component 5 is analogously feasible.

In the subsequent description, a temperature of the first component 4 before the treatment with the joining surface treatment device 20 in a range of approximately 19° C. to 21° C., thus ambient temperature is presumed. 'Heating a portion of the surface of the first component 4' subsequently stands for increasing the temperature of the first component 4 by approximately 10° C., thus to a component temperature of approximately of 29° C. to 31° C., however, also smaller or greater temperature increases of the surface of the component are feasible. During experiments, however great improvements in the airing time of the primer have already become apparent for temperature increases by 5° C. The possible heating, however, always has to be adjusted as a function of the material of the first component 4 and of the primer in order to prevent damaging them.

Figure 2:
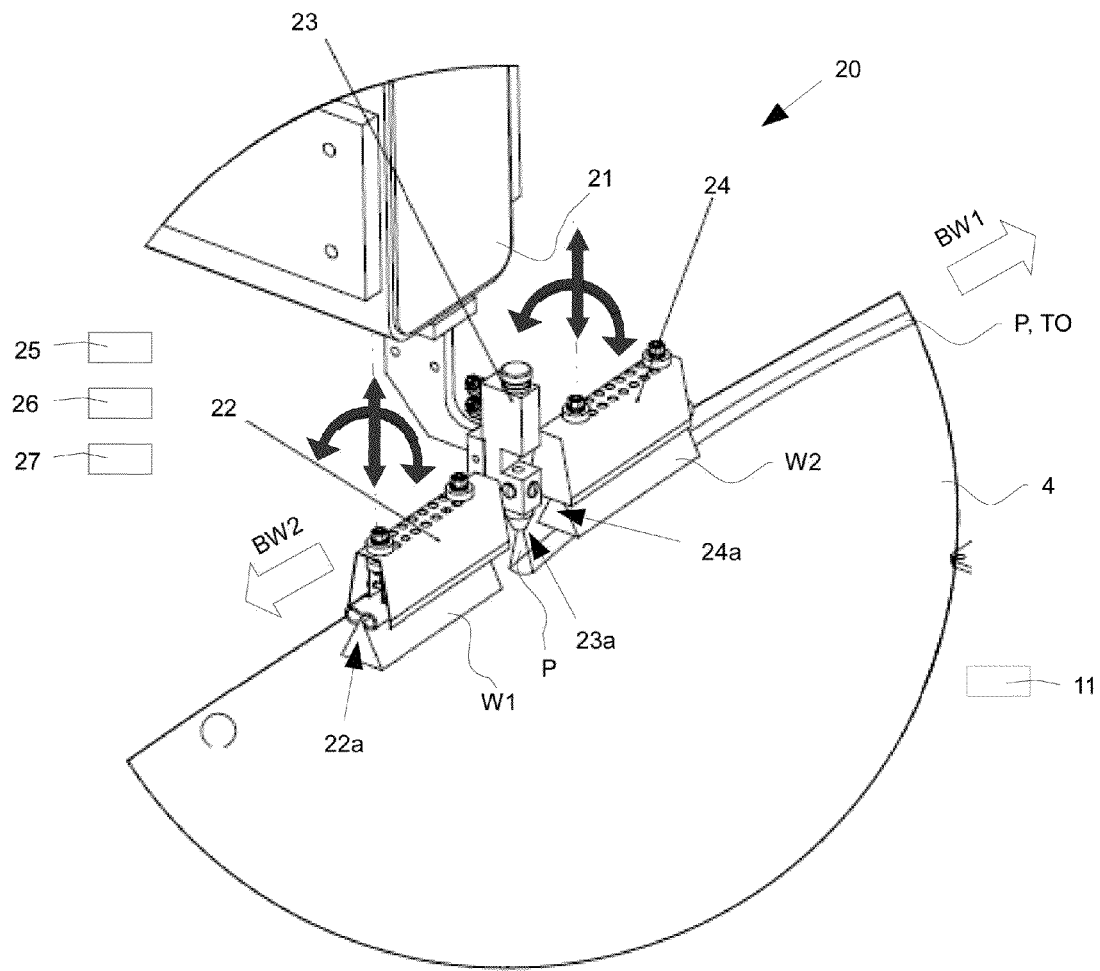
FIG. 2 illustrates a detail B of the joining surface treatment device illustrated in FIG. 1.

As apparent from FIG. 2 the joining surface treatment device 20 includes a support 21 for supporting a first heat source 22, a primer application device 23 and a second heat source 24. The first heat source 22 includes a heat outlet opening 22a for letting out heat W1 from the first heat source 22. The primer application device 23 includes a primer outlet opening 23a for letting out primer P from the primer application device 23 and for applying the primer to the component 4. The second heat source 24 includes a heat outlet opening 24a for letting out heat W2 from the second heat source 24. When the first heat source 22, the primer application device 23 and the second heat source 24 are arranged as illustrated in FIG. 2 the heat W1, W2 can exit from the first heat source 22 and the second heat source 24 and can heat the first component 4 at its surface portion TO oriented towards the heat outlet openings 22a, 24a. This portion of the surface TO approximately corresponds to the surface area which is covered in FIG. 2 with the applied primer P, however it can also be slightly wider than the primer P applied to the surface as it is illustrated in FIG. 2. The component 4 and the joining surface treatment device 20 move relatively to one another as illustrated in FIG. 2 by a block diagram arrow BW1 for the component 4 and a block diagram arrow BW2 for the joining surface treatment device 20. Herein, the first component can be driven by a first drive device 11 that is only schematically illustrated and/or the joining surface treatment device 20 can be driven by the second drive device 25 which is only schematically illustrated. The first and the second drive device 11, 25 are in turn controlled by the control device 40.

Thus, the first heat source 22, the primer application device 23 and the second heat source 24 are oriented towards a portion TO of the surface of the first component 4. Put differently, the heat outlet opening 22a, the primer outlet opening 23a and the heat outlet opening 24a are oriented towards one, indeed the same, surface of the component 24. Furthermore, the primer application device 23 is arranged downstream of the first heat source 22 and the second heat source 24 is arranged downstream of the primer application device 23. Herein, the first heat source 22, the primer application device 23 and the second heat source 24 are arranged in series one after another and oriented relative to one another as illustrated in FIG. 2. The first and second heat sources 22, 24, respectively, have elongated shapes, this means they are longer than wide and they are longitudinally arranged in the orientation of the above-mentioned series. By the same token also the heat outlet openings 22a, 24a have elongated shapes. The primer application device 23 arranged between the first heat source 22 and the second heat source 24 on the other hand has a punctiform primer outlet opening 23a. Thus, the first heat source 22 and the second heat source 24 and in particular their outlet openings 22a, 24a and the primer outlet opening 23a are adapted with respect to their shapes to the shape of the portion TO of the surface of the component 4 that is to be treated by the joining surface treatment device 20.

Due to this arrangement of the first heat source 22, the primer application device 23, and the second heat source 24 relative to the first component 4, the first heat source 22 can heat exactly the portion TO of the surface of the component 4 or the joining surface of the component 4 where the primer application device 23 applies the primer P immediately thereafter in a primer track P, TO. Furthermore, the second heat source 24 will subsequently heat approximately only the portion TO or the portion of the surface of the component 4, where also the primer P is applied.

The primer P is advantageously a conventional water based primer or a hydro primer which is sprayed from the primer outlet opening 23a to the component 4. The primer application by the primer application device 23 thus is contactless spraying. The conventional hydro primer is made from approximately 98% water and does not include any solvent. The primer P, however, can also be a black primer.

The first heat source 22 is advantageously moveable about its vertical axis by a schematically illustrated third drive device 26 or pivotable and/or vertically moveable up and down as illustrated in FIG. 2 by dark arrows. By the same token the second heat source 24 is advantageously moveable or pivotable by a schematically illustrated fourth drive device 27 about its vertical axis and/or vertically moveable in upward and downward direction as illustrated in FIG. 2 by dark arrows. The vertical axis of the first and second heat sources 22, 24 is illustrated in FIG. 2 as dashed line and it is perpendicular to the length of the first and second heat sources 22, 24 and orthogonal to the joining surface of the first component 4 or the portion TO of the first component 4.

Figure 3:
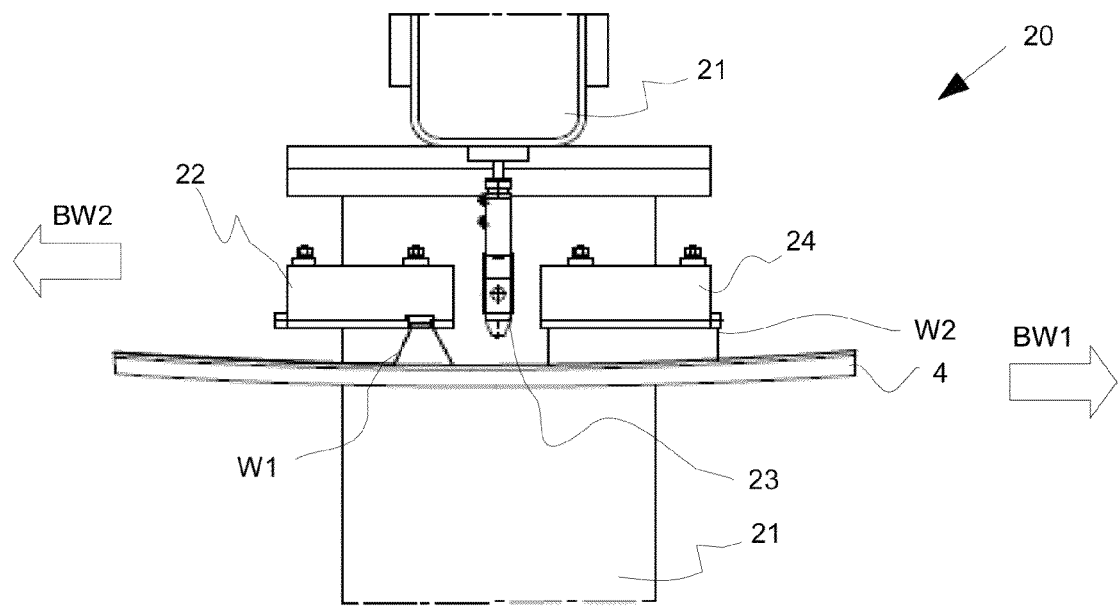
FIG. 3 illustrates a side view of the detail B of the joining surface treatment device illustrated in FIG. 1.
Figure 4:
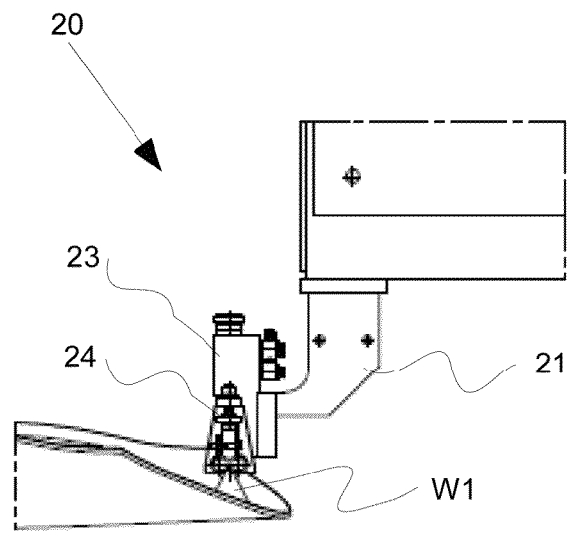
FIG. 4 illustrates another side view of the detail B of the joining surface treatment device illustrated in FIG. 1.

FIGS. 3 and 4 illustrate two different lateral views of detail B illustrated in FIG. 2 of the joining surface treatment device of FIG. 1. In these FIGs. all elements are provided with identical reference numerals. For reasons of clarity not all elements are provided with reference numerals.

As illustrated in FIGS. 3 and 4, the component 4 is not a flat plate or disc, but it has a curved shape like, for example, a front or back window of a vehicle. In this case, a movement of the first and/or second heat source 22, 24 through pivoting and up and down movement relative to the bent shape of the component 4, in particular in the form of the glass window, is particularly advantageous. This way the component 4, for example, when the joining surface is arranged along the entire circumference of the component 4 like in a glass window for vehicles, can be treated without problem in a simple manner along the entire circumference with the joining surface treatment device 20.

Figure 5:
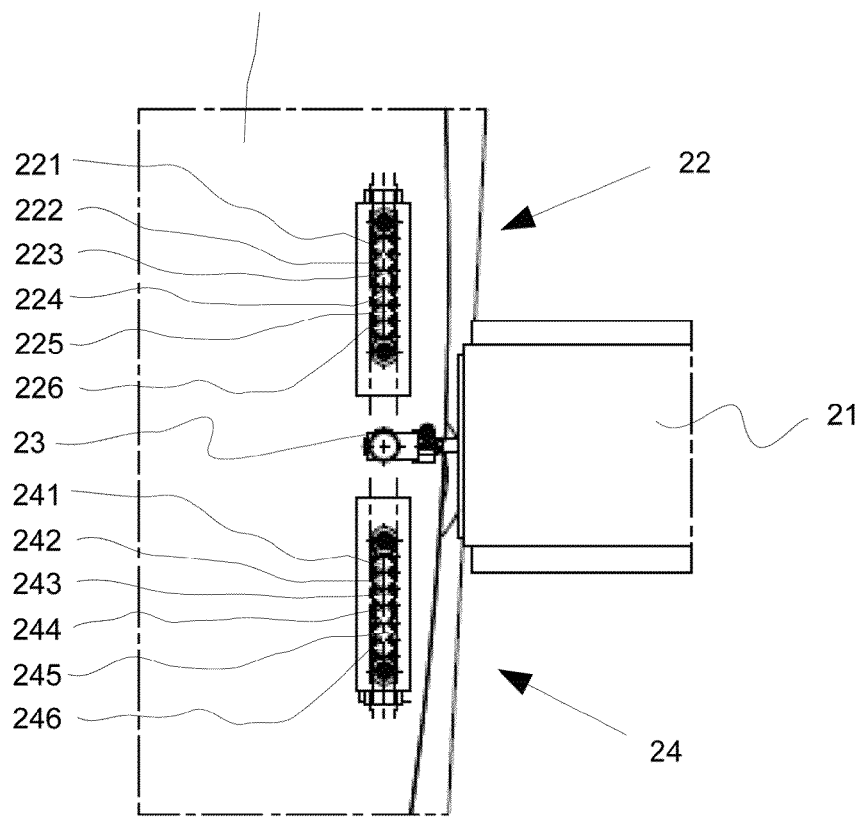
FIG. 5 illustrates a bottom view of the joining surface treatment device according to the invention according to detail B of FIG. 1.

In FIG. 3 furthermore the heat radiation W1 has a smaller radiation cone than the radiation cone of the heat radiation W1 illustrated in FIG. 2. FIG. 5 illustrates how radiation cones of this type can be achieved.

FIG. 5 illustrates a bottom view of the arrangement including the first heat source 22, the primer application device 23 and the second heat source 24. The first heat source 24 is configured from plural individual radiation emitters 221, 222, 223, 224, 225, 226 which are arranged in series one after another as illustrated in FIG. 5. In the same manner, the second heat source 24 can be made from plural single radiation emitters 241, 242, 243, 244, 245, 246 which are arranged in series one after another as also illustrated in FIG. 5. As required and as detectable, for example, with a temperature sensor of the detection device 50, the control device 40 can turn on and off the particular radiation emitters 221 through 226 and 241 through 246. Thus, the length of the portion TO of the surface of the first component 4 that is heatable with the first and second heat sources 22, 24 is adjustable. Furthermore, the radiation of the single radiation emitters 221 through 226 and 241 through 246 and thus the first and the second heat source 22, 24 is continuously adjustable.

Due to all these measures, damaging the first component 4 or its material can be avoided.

Figure 6:
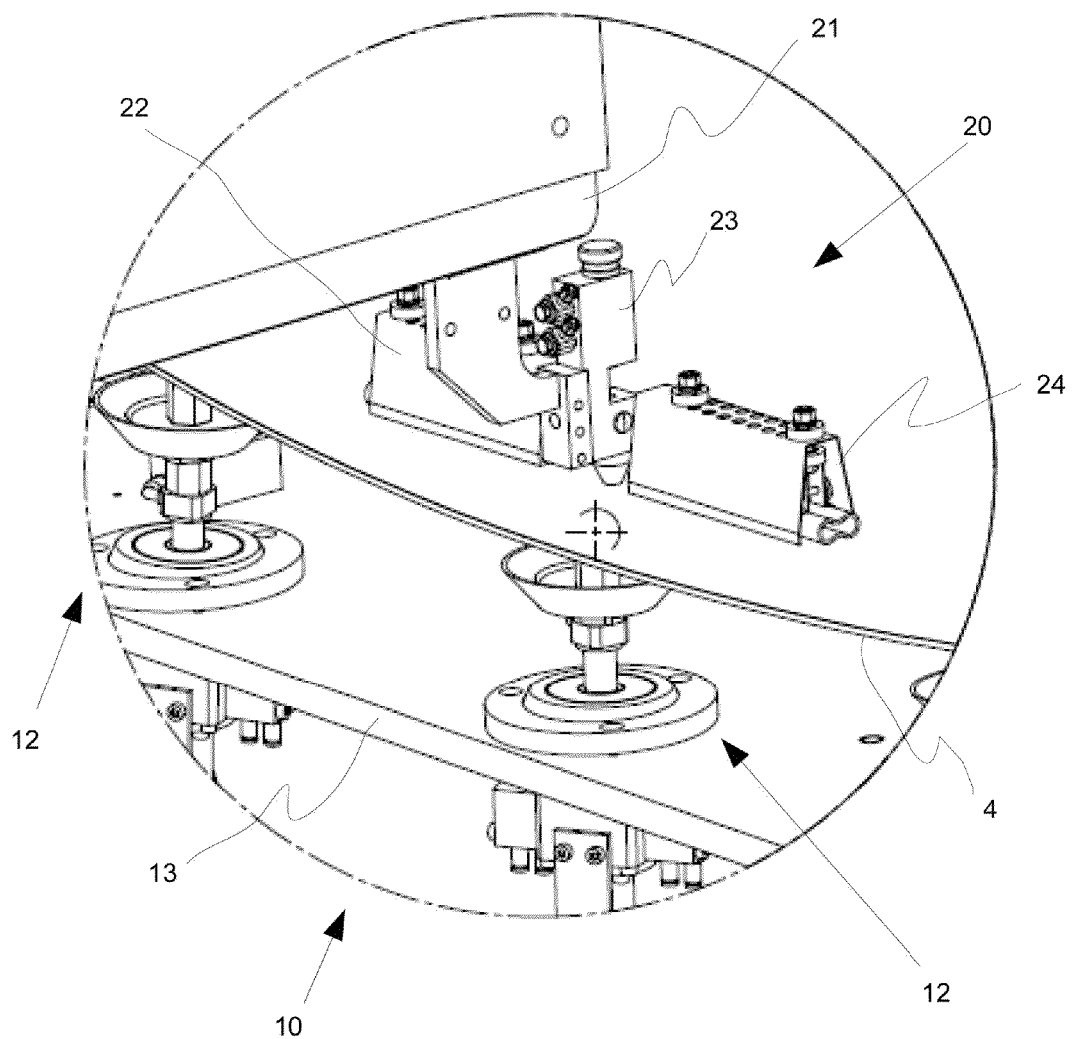
FIG. 6 illustrates another side view of detail B of the joining surface treatment device illustrated in FIG. 1.

FIG. 6 illustrates a detail of the robot 10 with the joining surface treatment device 20. The robot 10 holds the component 4 through at least one suction gripper 12 which is attached at a beam 13 of the robot 10. The suction gripper 12 and the beam 13 are disclosed in EP 1 256 421 B1 which is incorporated in its entirety by this reference and relates to a prior invention of the first inventor of the instant application and are therefore not described herein in more detail. The robot 10 or its suction grippers 12 and its beam 13 form a receiving device for receiving the component and can receive the component 4 without tension. The robot 10 or the receiving device 10 can pivot the supported first component 4 under the joining surface treatment device 20 so that preferably always the same distance is provided between the component 4 and the joining surface treatment device 20. Thus, the portion TO of the surface of the first component 4 at which portion the first component 4 shall be joined with the second component 5 is oriented towards the arrangement of first and second heat source 22, 24 and the primer application device 23 in the course of a treatment of the first component 4 with the joining surface treatment device 20.

The robot 10 can move or pivot the first component 4 faster or slower relative to the joining surface treatment device 20 as a function of the shape of the first component 4. In particular, the robot 10 can move the first component 4 in the corner portion of the first component 4, thus in case of a rectangular glass pane at its four corners, slower relative to the joining surface treatment device 20 than for straight connecting pieces of the corners. In order to still obtain an even primer application over the entire circumference of the first component 4, the control device 40 can control the primer application device 23 so that it applies less primer in the corner portion of the first component 4 than in the other portions. This device, the dosing of the primer P through the primer application device 23 is performed as a function of the relative velocity between the primer application device 23 and the first component 4. By the same token, the heat radiation W1, W2 emitted by the first heat source 22 and the second heat source 24 can be controlled and regulated as a function of the relative velocity of the primer application device 23 and the first component 4. Additionally, the control and regulation can be provided as function of the detection result of a temperature sensor of the detection device 50 that is not illustrated. Particular measures or all these measures combined provide even heating of the joining surface or the portion TO of the surface of the first component 4.

All movements of the robot 10, thus in particular in upward and downward direction, to the right and the left, to the front and to the rear, the combinations thereof, etc. can also be controlled or regulated by the control device 40 based on the detection results of the detection device 50. The detection results can be based on information from position sensors, angle sensors, gyro meters, velocity sensors, etc.

In particular the joining surface treatment device 20 and its components can be stationary when the robot 10 moves the first component 4 past or along the joining surface treatment device 20 and its components.

Figure 7:
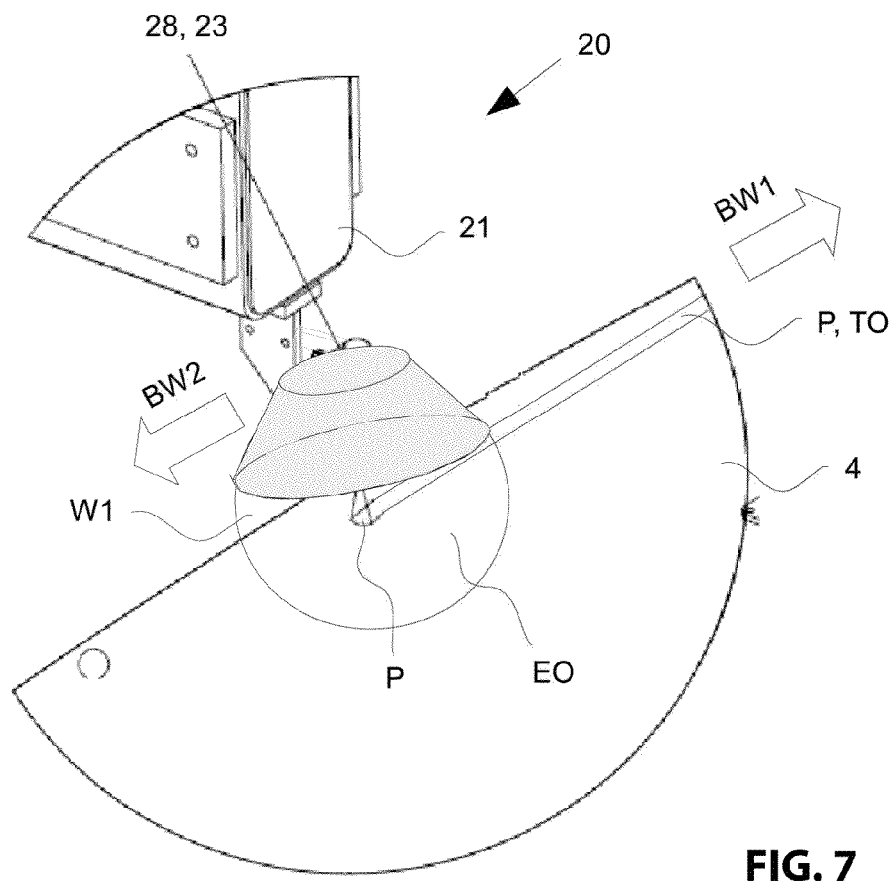
FIG. 7 illustrates a detail of a joining surface treatment device according to a second embodiment of the present invention.

FIG. 7 illustrates a detail of a joining surface treatment device 20 according to a second embodiment analogous to detail B of the joining surface treatment device 20 according to the first embodiment illustrated in FIG. 2. Identical or like components are provided with identical reference numerals in both embodiments.

In the joining surface treatment device 20 according to the second embodiment instead of two heat sources 22, 24 only one heat source is provided which heats a portion EO of the component 4. The primer application device 23 is arranged approximately in the center of the heat source 28. Thus, the heat source 28 can heat before or after, or preheat and post heat, the portion TO of the surface of the first component 4 at which portion the first component 4 shall be joined with the second component 5 before and also after the application of the primer P to the first component 4.

The heat source 28 can be, for example, ring shaped with the primer application device 23 arranged in a center of the ring. Thus, in this case the post heating portion is identical to the pre heating portion. The primer application device 23, however, does not have to be arranged in the center of the heat source 28. It is also feasible in particular that the heat source 28 and the primer application device 23 are arranged relative to one another so that the heat source 28 heats or preheats the first component 4 only before applying the primer P. Alternatively, it is also feasible in particular that the heat source 28 and the primer application device 23 are arranged relative to one another so that the heat source 28 heats or post heats the first component 4 only after application of the primer P. All other variants there between are also feasible.

Arranging only one heat source 28 relative to the primer application device 23 according to this embodiment is particularly advantageous when the primer has to be applied in a curve to the first component 4, thus, for example, at the corners of the front or rear window of a vehicle 3. Thus, pivoting the heat source 28 can be omitted. On the other hand, the portion EO heated by the heat source 28 is slightly larger than in the first embodiment.

All other configurations of the second embodiments are identical or analog to those of the first embodiment and are therefore not described in more detail.

Figure 8:
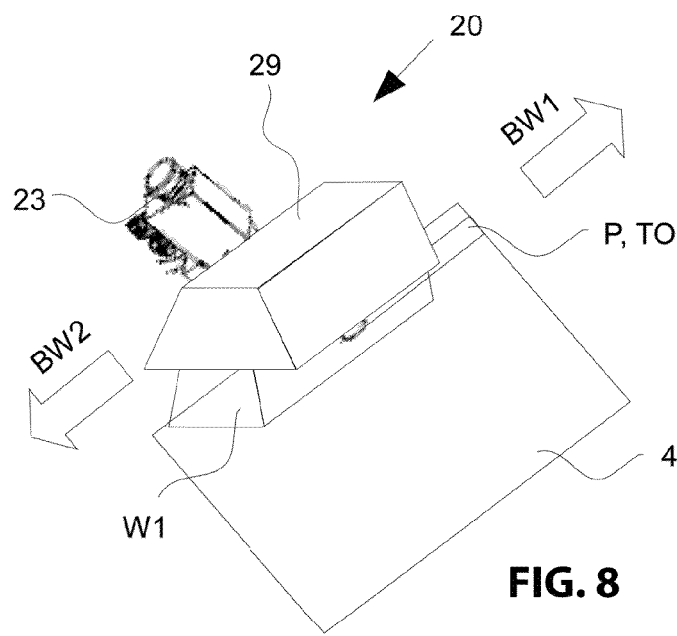
FIG. 8 illustrates a detail of a joining surface treatment device according to a third embodiment of the present invention.

FIG. 8 illustrates a detail of another joining surface treatment device 20 according to a third embodiment analogous to the details of the joining surface treatment device 20 according to the first and second embodiment illustrated in FIGS. 2 and 7. Identical and like elements are provided with identical reference numerals in all embodiments.

In the joining surface treatment device 20 according to the third embodiment, like in the second embodiment instead of two heat sources 22, 24 only one heat source 29 is provided. In this embodiment, however, the primer application device 23 is arranged laterally adjacent to the heat source 29, wherein the primer application device 23 applies the primer P approximately in the center of the heated portion TO of the surface of the first component 4 heated by the heat source 29. Thus, also the heat source 29 can heat the portion TO of the surface of the first component 4 at which portion the first component 4 shall be joined with the second component 5 before and after the application of the primer P on the first component 4. Like in the second embodiment, pre heating or post heating are also feasible by themselves or all combinations thereof.

The primer application device 23 is preferably arranged or configured so that it applies the primer P at an optimized angle onto the first component 4.

The heat source 29 can be elongated as illustrated in FIG. 8 for the first embodiment. Thus, the heat source 29 is adapted to the portion TO of the surface of the first component 4 where the first component 4 shall be joined with the second component 5.

When the primer has to be applied in a curved track onto the first component 4 the heat source 29 can be moveable as required like the first and second heat sources 22, 24 of the first embodiment.

All other configurations of the third embodiment are identical or analogous to the configurations of the first embodiment and are therefore not described in more detail.

All configurations of the joining surface treatment device 20 described above and of the joining surface treatment method can be used by themselves or in all possible combinations. Thus in particular the following modifications are feasible.

The shape of the first and second components 4, 5 is selectable at will and is not limited to the shapes illustrated in the FIGs.

The shape of the heat sources 28, 29 of the second and third embodiments are freely selectable in as far as the described function of heating the portion TO of the surface of the first component 4, to which portion the first component 4 shall be joined with the second component 5, is provided by the heat source 28, 29 before and after the primer application.

It is advantageous when the heat sources 22, 24, 28, 29 are infrared radiation sources. The heat sources 22, 24, 28, 29, however, can also generate heat through induction, hot air or hot air blowers or hot compressed air. For example, it is feasible to configure the first heat source 22 as infrared radiation source and the second heat source 24 as a heat source which generates warm compressed air. The compressed air can be used to additionally accelerate the airing of the primer. Warm compressed air means that the compressed air is heated so that it can heat the first component 4 as described above. Also other combinations of the heat sources 22, 24 are feasible which are not recited explicitly.

In case minimum energy use is the goal, however, in any case according to the present state of the art a joining surface treatment device 20 and factory automation machinery 1 is advantageous that is operated purely by electric motors.

In case one of the heat sources 22, 24, 28, 29 is configured as an infrared heat source the heat source is advantageously provided with a glare shield or a housing. This can be implemented by the body of the heat source 22, 24, 28, 29 which is illustrated in FIG. 2 through FIG. 4 above the heat source outlet opening 22a, or 24a. As an alternative to a heat source including plural single punctiform radiation emitters 221 through 226 or 241 through 246 as illustrated in FIG. 5 and also in FIG. 2, the first and/or second heat source 22, 24 can also be an X-ray emitter. The same applies for the heat sources 28, 29 of the second and third embodiment.

For a first heat source 22 an infrared radiation source with 1500 watts power output can be used, wherein an infrared radiation source with 1000 W power is selected as a second heat source 24. Alternatively, an infrared radiation source with 1000 W power can be used as a first heat source 22, wherein an infrared radiation source with 600 W power is selected as a second heat source 24.

It is advantageous that the heating power of the heat sources 22, 24, 28, 29 is continuously controllable as required. In particular, also the heating power of the first or second heat source 22, 24 can be zero, this device with respect to a primer application only pre heating or post heating is performed.

The primer application device 23 can be a conventional piston dosing device that operates with atmospheric pressure.

The primer P can already be preheated before being applied to the first component 4. For example, a conventional hydro primer can be pre heated to a temperature of up to approximately 35° C. and applied to the first component 4. In any case, heating the primer P and also the first component 4 before applying the primer to the first component 4 depends on the type of primer P selected in order not to damage the molecular structure of the primer by overheating.

In case a glass window is the first component 4 that shall be installed into a vehicle, the width of the primer track P, TO or of the portion TO of the surface of the component 4 can be, for example, approximately 18 to 20 mm. The thickness of the primer P applied to the surface of the first component 4 thus is in the μm range. Furthermore, it is advantageous that the glass pane is provided with an opaque silk screen printed ceramic coating which prevents the glue of the installed glass window from aging due to light impact. In this case, instead of black primer which is otherwise used for preventing glue aging, a conventional hydro primer is used. Since the conventional hydro primer differently from black primer does not include solvent, also when airing the hydro prime advantageously no solvent is released to the environment. The hydro primer has an airing time of approximately 20 seconds when it is used together with the joining surface treatment device 20 and the joining surface treatment method described above.

In a factory automation machinery 1 tested by the inventors the time for applying the primer P onto the first component 4 of a front window of a motor vehicle had a value of approximately 14 seconds when the relative velocity between the first component 4 and the joining surface treatment device 20 had a value of 300 mm per second. Since the airing time of the hydro primer configured as a primer P is overall approximately 20 seconds as recited above, only a waiting time of 6 seconds remains until gluing the front window can be started. The cycle time for pre treating the first component 4 or the front window in this case was 20 seconds. When using black primer the cycle time is 30 seconds.

Herein, the cycle time includes receiving the first component or the second component for treatment, the treatment itself and putting down the component again. This also includes an optional movement of the component and of the joining surface treatment device or its elements relative to one another.

The gluing device 30 and the robot 10 or the first component 4 can perform the same relative movement for applying the glue to the first component 4 as previously performed by the joining surface treatment device 20 and the robot 10 or the first component 4. Herein, the gluing device 30 can perform applying the glue or the adhesion enhancement agent directly or without putting down the first component 4 after airing the primer P subsequent to the treatment by the joining surface treatment device 20.

As an alternative to the continuous primer track P, TO, the joining surface treatment device 20 or the primer application device can also apply the primer P only at particular locations of the surface of the first component 4. This yields an interrupted primer track P, TO. A primer application of this type can also be controlled by the control device 40. Then it is advantageous that also the first component 4 is only heated in the portion or at the portions TO of its surface where the primer P is applied and where the gluing shall be performed.

What is claimed is:

1. A joining surface treatment device for treating a joining surface of a component, which joining surface is used for joining two components, the joining surface treatment device comprising:
   a heat source for heating a portion of a surface of a first component at which portion the first component shall be joined with a second component; and
   a primer application device for applying a primer to the portion of the surface of the first component which portion is heatable by the heat source,
   wherein the heat source and the primer application device are arranged at each other so that the heat source heats the portion of the surface of the first component, at which portion the first component shall be joined with the second component, both before and after applying the primer by the primer application device, and
   wherein the joining surface treatment device includes a drive device for driving the arrangement including the heat source and the primer application device in a movement relative to the first component.

2. The joining surface treatment device according to claim 1, wherein a heating power of the heat source is continuously controllable.

3. The joining surface treatment device according to claim 1,
   wherein the primer application device is arranged at the heat source so that the primer application device applies the primer approximately in a center of the portion of the surface of the first component which portion is heated by the heat source.

4. The joining surface treatment device according to claim 1, wherein the joining surface treatment device is configured so that the first component is moveable along the arrangement including the heat source and the primer application device.

5. The joining surface treatment device according to claim 1, wherein the heat source includes an infrared radiation source or a laser source or an induction source or a hot air blower or a blower for introducing warm compressed air.

6. The joining surface treatment device according to claim 1, wherein the heat source has a shape that is adapted to the joining surface or the heat source is pivotable about the joining surface.

7. The joining surface treatment device according to claim 1, wherein the primer application device is configured for applying hydro primer.

8. The joining surface treatment device according to claim 1, wherein the primer application device is configured for applying heated primer.

9. The joining surface treatment device according to claim 1, wherein the primer application device is configured so that it adjusts an amount of applied primer as a function of a velocity of a relative movement between the first component and the arrangement including the heat source and the primer application device.

10. The joining surface treatment device according to claim 1,
wherein the primer application device is arranged approximately in a center of the heat source.

11. The joining surface treatment device according to claim 10, wherein the heat source is ring shaped with the primer application device arranged in the center of the ring.

12. The joining surface treatment device according to claim 1,
wherein the primer application device is arranged on a side of the heat source.

13. The joining surface treatment device according to claim 1,
wherein the heating power of the heat source is controlled as a function of a temperature detection of a detection device.

14. A piece of factory automation machinery for producing an object with at least two components, comprising:
a joining surface treatment device according to claim 1; and
a receiver for receiving a first component so that a portion of a surface of the first component at which portion the first component shall be joined with a second component is oriented towards an arrangement including the heat source and the primer application device when the first component is treated with the joining surface treatment device.

15. The piece of factory automation machinery according to claim 14, further comprising:
a drive device for driving the receiver so that the receiver or the arrangement move relative to one another.

16. The piece of factory automation machinery according to claim 14, further comprising:
a gluing device for gluing the first component and the second component together at the joining surface,
wherein the gluing device is arranged directly downstream of the joining surface treatment device.

17. A joining surface treatment method for treating a joining surface of a component for joining two components, comprising the steps of:
heating a portion of a surface of a first component by one heat source at which portion the first component shall be joined with a second component; and
applying a primer by a primer application device to the portion of the surface of the first component which portion is heatable by the heat source,
wherein the heat source and the primer application device are arranged at each other so that the heat source heats in the heating step the portion of the surface of the first component, at which portion the first component shall be joined with the second component, both before and after applying the primer, and
wherein the joining surface treatment device includes a drive device driving the arrangement including the heat source and the primer application device in a movement relative to the first component.

18. A joining surface treatment device for treating a joining surface of a component, which joining surface is used for joining two components, the joining surface treatment device comprising:
a heat source for heating a portion of a surface of a first component at which portion the first component shall be joined with a second component; and
a primer application device for applying a primer to the portion of the surface of the first component which portion is heatable by the heat source,
wherein the heat source and the primer application device are arranged to at each other so that the heat source heats the portion of the surface of the first component, at which portion the first component shall be joined with the second component, both before and after applying the primer by the primer application device,
wherein the joining surface treatment device includes a drive device for driving the arrangement including the heat source and the primer application device in a movement relative to the first component,
wherein a heating power of the heat source is continuously controllable,
wherein the primer application device is arranged at the heat source so that the primer application device applies the primer approximately in a center of the portion of the surface of the first component which portion is heated by the heat source,
wherein the joining surface treatment device is configured so that the first component is moveable along the arrangement including the heat source and the primer application device,
wherein the heat source has a shape that is adapted to the joining surface or the heat source is pivotable about the joining surface,
wherein the primer application device is arranged approximately in a center of the heat source, and
wherein the heat source is ring shaped with the primer application device arranged in the center of the ring.

* * * * *

UNITED STATES PATENT AND TRADEMARK OFFICE
CERTIFICATE OF CORRECTION

PATENT NO. : 8,678,060 B2  
APPLICATION NO. : 13/411593  
DATED : March 25, 2014  
INVENTOR(S) : Siegfried Dietz et al.

It is certified that error appears in the above-identified patent and that said Letters Patent is hereby corrected as shown below:

In the Claims

Delete Claim 18

Col. 14, Claim 18, lines 14-53, insert

--18. A joining surface treatment device for treating a joining surface of a component, which joining surface is used for joining two components, the joining surface treatment device comprising: a heat source for heating a portion of a surface of a first component at which portion the first component shall be joined with a second component; and a primer application device for applying a primer to the portion of the surface of the first component which portion is heatable by the heat source, wherein the heat source and the primer application device are arranged at each other so that the heat source heats the portion of the surface of the first component, at which portion the first component shall be joined with the second component, both before and after applying the primer by the primer application device, wherein the joining surface treatment device includes a drive device for driving the arrangement including the heat source and the primer application device in a movement relative to the first component, wherein a heating power of the heat source is continuously controllable, wherein the primer application device is arranged at the heat source so that the primer application device applies the primer approximately in a center of the portion of the surface of the first component which portion is heated by the heat source, wherein the joining surface treatment device is configured so that the first component is moveable along the arrangement including the heat source and the primer application device, wherein the heat source has a shape that is adapted to the joining surface or the heat source is pivotable about the joining surface, wherein the primer application device is arranged approximately in a center of the heat source, and wherein the heat source is ring shaped with the primer application device arranged in the center of the ring.--

Signed and Sealed this  
Eleventh Day of November, 2014

Michelle K. Lee  
*Deputy Director of the United States Patent and Trademark Office*